United States Patent
Blanchard (10) Patent No.: US 8,225,810 B2
(45) Date of Patent: Jul. 24, 2012

(54) IRRIGATION CONTROL APPARATUS, SYSTEM, AND METHOD

(76) Inventor: Rod N. Blanchard, Farmington, UT (US)

(*) Notice: Subject to any disclaimer, the term of this patent is extended or adjusted under 35 U.S.C. 154(b) by 400 days.

(21) Appl. No.: 12/637,607

(22) Filed: Dec. 14, 2009

(65) Prior Publication Data
US 2010/0147389 A1    Jun. 17, 2010

Related U.S. Application Data (60) Provisional application No. 61/122,184, filed on Dec. 12, 2008.

(51) Int. Cl.
*F16K 17/36* (2006.01)
(52) U.S. Cl. .......... 137/78.3; 239/63; 239/69; 700/284; 73/73
(58) Field of Classification Search .......... 137/78.2, 137/78.3; 239/63–65, 67, 69; 73/73; 700/284
See application file for complete search history.

(56) References Cited

U.S. PATENT DOCUMENTS

| | | | |
|---|---|---|---|
| 6,079,433 A * | 6/2000 | Saarem ................ | 137/1 |
| 6,600,971 B1 * | 7/2003 | Smith et al. ........... | 700/284 |
| 7,165,730 B2 * | 1/2007 | Clark et al. ........... | 239/67 |
| 2006/0278728 A1 | 12/2006 | Kates | |
| 2007/0102538 A1 | 5/2007 | Kates | |
| 2008/0251602 A1 | 10/2008 | Leggett et al. | |
| 2009/0177330 A1 * | 7/2009 | Kah, Jr. .............. | 700/284 |

FOREIGN PATENT DOCUMENTS
DE    10330141 A1    3/2005

OTHER PUBLICATIONS
PCT/US2009/067936 ISR and Written Opinion, Aug. 16, 2010.

* cited by examiner

*Primary Examiner* — Craig Schneider
*Assistant Examiner* — Ian Paquette
(74) *Attorney, Agent, or Firm* — Kunzler Law Group, PC (57) ABSTRACT

Described herein are various embodiments of an apparatus, system, and method for controlling the irrigation of an area. In one embodiment, an apparatus includes at least one sensor module that is configured to detect the soil moisture content of soil in an irrigation area. The sensor module is further configured to determine a rate of change of the soil moisture content based on the detected soil moisture content. A rate at which the sensor module detects the soil moisture content of the soil is based on the determined rate of change of the soil moisture content. The apparatus also includes a central control module that is configured to execute an irrigation event for an irrigation area if the detected soil moisture content reaches a moisture content lower threshold. The central control module also is configured to terminate the irrigation event for the irrigation area if the detected soil moisture content reaches a moisture content upper threshold.

20 Claims, 8 Drawing Sheets

IRRIGATION CONTROL APPARATUS, SYSTEM, AND METHOD

CROSS-REFERENCE TO RELATED APPLICATION

This application claims the benefit of U.S. Provisional Patent Application No. 61/122,184, filed Dec. 12, 2008, which is incorporated herein by reference.

FIELD

This disclosure relates to irrigation control systems, and more particularly to an irrigation control system utilizing wirelessly transmitted data collected by soil moisture sensors.

BACKGROUND

Irrigation or watering systems for controlling irrigation events for irrigation areas are well known in the art. Typical watering systems include control boxes configured to open and close irrigation valves according to predefined watering schedules. Most conventional watering systems do not account for the actual moisture content of the soil when executing the watering schedules. Accordingly, such systems are prone to wasting water resources and energy required to transport water within the system.

Additionally, conventional systems include controllers that are hard-wired to irrigation valves. Accordingly, the wires and associated connections are susceptible to damage from exposure to the elements, burrowing rodents, hand tools, heavy equipment, and the like. Additionally, the wires typically are buried and often difficult to locate and repair.

Some recent watering systems use soil moisture sensors to detect the moisture content of the soil and do not execute a watering event unless the moisture content is below a certain threshold. Although such systems may conserve water by executing a watering event only when the soil is dry enough and ending the watering event as soon as the soil reaches a predefined saturation limit, because the systems are wired, they are unable to cover large irrigation areas without excessive cost and installation difficulties. Additionally, the soil moisture sensors of conventional watering systems are designed to detect the moisture content of the soil only on a single plane or at a single depth. Even complex watering systems known in the art often require an installer to know and input a significant number of the characteristics of the irrigation area to be watered when installing the system. For example, an installer often needs to know and input the date, time, soil type for each irrigation zone, plant types for each irrigation zone, ground slope by zone, watering days, watering times, and target watering durations.

Also, conventional systems do not utilize GPS technology for locating functioning and malfunctioning system components and enabling accurate data synchronization across multiple components.

SUMMARY

The subject matter of the present application has been developed in response to the present state of the art, and in particular, in response to the problems and needs in the art that have not yet been fully solved by current irrigation control systems. Accordingly, the subject matter of the present application has been developed to provide apparatus, systems, and methods for controlling irrigation events that overcome at least some shortcomings of the prior art irrigation control systems.

For example, according to some embodiments, an irrigation control system includes a central control module that communicates wirelessly with sensors located within irrigation zones of an irrigation area. Accordingly, the costs associated with materials, installation, and repair associated with wired systems are avoided. The sensors not only detect the moisture content of the soil, but determine the rate of change of the soil moisture content over time. In certain implementations, the system is configured to automatically collect information concerning the date, time, soil type, and plant water needs without input from a user. The sensors communicate soil moisture data to the central control module based on the soil conditions. More specifically, soil moisture data is communicated at a specified rate when soil moisture content is declining and at a second specified rate, generally faster than the first specified rate, when soil moisture content is increasing. Because the rate at which data is communicated from the sensors to the control module is accelerated during irrigation events, the duration of irrigation events is dynamically controlled, which eliminates over-watering.

Additionally, in certain implementations, the central control module and sensor modules each include an independent power supply that is rechargeable by renewable energy systems, such as solar and hydro-electric systems. In some embodiments, the irrigation control system utilizes a network that links multiple soil moisture content sensors and multiple control modules. Further, in some embodiments, the irrigation control system utilizes multiple soil moisture content sensors to detect rain events and to forgo or stop irrigation events if a rain event is detected. Also, according to some embodiments, the various components of the irrigation control system include an atomic time module or GPS module to synchronize communications and irrigation events between the components.

According to another embodiment, an apparatus for controlling irrigation events includes at least one sensor module that is configured to detect the soil moisture content of soil in an irrigation area. The sensor module is further configured to determine a rate of change of the soil moisture content based on the detected soil moisture content. A rate at which the sensor module detects the soil moisture content of the soil is based on the determined rate of change of the soil moisture content. The apparatus also includes a central control module that is configured to execute an irrigation event for an irrigation area if the detected soil moisture content reaches a moisture content lower threshold. The central control module also is configured to terminate the irrigation event for the irrigation area if the detected soil moisture content reaches a moisture content upper threshold.

In certain implementations of the apparatus, at least one sensor module detects the soil moisture content of the soil at a first rate when the determined moisture content in the soil is declining and at a second rate when the determined moisture content in the soil is increasing. The first rate is slower than the second rate. At least one sensor module can include a plurality of sensor modules each associated with a respective portion of the irrigation area. The central control module can be configured to control the timing and duration of irrigation event based on a comparison between the soil moisture content data received from the plurality of sensor modules.

According to some implementations of the apparatus, at least one sensor module includes a power supply module that has a battery and a battery recharging system. The battery powers at least one sensor module. In certain implementations, the battery recharging system includes a solar regenerator system. In the same of other implementations, the battery recharging system includes a hydro-electric regenerator system.

In yet some implementations, the apparatus further includes a time module configured to time-stamp the communication of soil moisture content data to the central control module. The time-stamp can be based on at least one of an atomic radio time signal and a GPS signal. At least one sensor module can include a GPS module configured to receive a GPS signal and determine a location of at least one sensor module based on the GPS signal.

According to certain implementations of the apparatus, at least one sensor module includes at least one soil moisture sensor embeddable within the soil of the irrigation area. At least one soil moisture sensor is configured to take soil moisture readings at a first rate during at least one of an irrigation event and a rain event and at a second rate when irrigation and rain events are not occurring. The first rate is higher than the second rate. At least one soil moisture sensor can be configured to detect the soil moisture content of the soil on at least two vertically-separated planes of the soil. The soil moisture content of the irrigation area can be based on a comparison between the detected soil moisture contents of the respective at least two vertically-separated planes of the soil.

In another embodiment, a system for controlling irrigation events includes a central controller, at least two satellite controllers, and at least two sensors. The central controller is remote from an irrigation area comprising at least two irrigation zones. The at least two satellite controllers are each positioned within a respective one of the at least two irrigation zones. Each satellite controller is configured to execute irrigation events for the corresponding irrigation zone of the irrigation area in response to communications received from the central controller. The at least two satellite controllers and the central controller communicate over a first wireless network. The at least two sensors are each positioned within a respective one of the at least two irrigation zones. Each sensor is configured to detect a soil moisture content of the corresponding irrigation zone and to transmit soil moisture content data to a corresponding satellite controller via a second wireless network. The second wireless network can be different than the first wireless network.

In certain implementations, the system further includes at least two rechargeable power sources each in power supply communication with a respective one of the at least two sensors.

According to some implementations of the system, the at least two satellite controllers each generate irrigation event requests for a corresponding irrigation zone based on the detected soil moisture content of the corresponding irrigation zone. The requests are communicated to the central controller, which grants, rejects, or suspends the requests based on predetermined prioritization parameters. The predetermined prioritization parameters can be based on at least one of an impact of simultaneous execution of multiple irrigation events and pre-scheduled watering time intervals for each irrigation zone.

According to another embodiment, a method for controlling an irrigation event for an irrigation area includes detecting a soil moisture content of a plurality of irrigation zones of the irrigation area using a plurality of sensors each located within a respective irrigation zone. The method also includes determining an irrigation event prioritization schedule if the detected soil moisture content of at least two of the plurality of irrigation zones reaches respective lower thresholds. The prioritization schedule is based on a water flow capacity associated with the irrigation area. The method also includes executing at least one irrigation event according to the irrigation event prioritization schedule.

In certain implementations, the irrigation event prioritization schedule comprises concurrently executing irrigation events for the at least two of the plurality of irrigation zones if a predicted combined water flow rate for the irrigation events is less than the water flow capacity. Similarly, in some implementations, the irrigation event prioritization schedule comprises postponing the execution of an irrigation event for at least one of the at least two of the plurality of irrigation zones if a predicted combined water flow rate for irrigation events for the at least two of the plurality of irrigation zones is more than the water flow capacity. The method also can include tracking a flow rate of water into the irrigation area during at least one irrigation event.

In certain implementations of the method, the irrigation event is executed if the soil moisture content for the irrigation area is below the depletion method, a rain event is not occurring, and a desired execution time is within a predetermined time interval. In the same or other implementations, soil moisture content data is transmitted according to a high frequency timing schedule (e.g., at a relatively higher rate) if at least one of the determined moisture content rate of change is increasing and the soil moisture content is below a saturation threshold. In contrast, soil moisture content data is transmitted according to a low frequency timing schedule (e.g., at a relatively lower rate) if at least one of the determined moisture content rate of change is not increasing and the soil moisture content is above a saturation threshold. The low frequency timing schedule can include transmitting the soil moisture content data from the sensor to the irrigation event control module once in a time period between approximately one hour and approximately six hours. The high frequency timing schedule can include transmitting the soil moisture content data from the sensor to the irrigation event control module once in a time period between approximately five seconds and approximately one minute.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will be more fully apparent from the above description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Generally, described herein are various embodiments of an irrigation control system utilizing soil moisture sensors, wireless technology, and energy-efficient components for irrigating a location in a cost-effective and energy-reducing manner. In certain embodiments, the irrigation control system implements a unique method for polling and transmitting soil moisture data from remote soil moisture sensors that conserves energy without sacrificing performance. In yet some embodiments, the irrigation control system facilitates dynamic irrigation events by automatically adjusting the attributes of one or more irrigation events based on any of various factors, such as soil moisture depletion and soil moisture saturation.

Figure 1A:
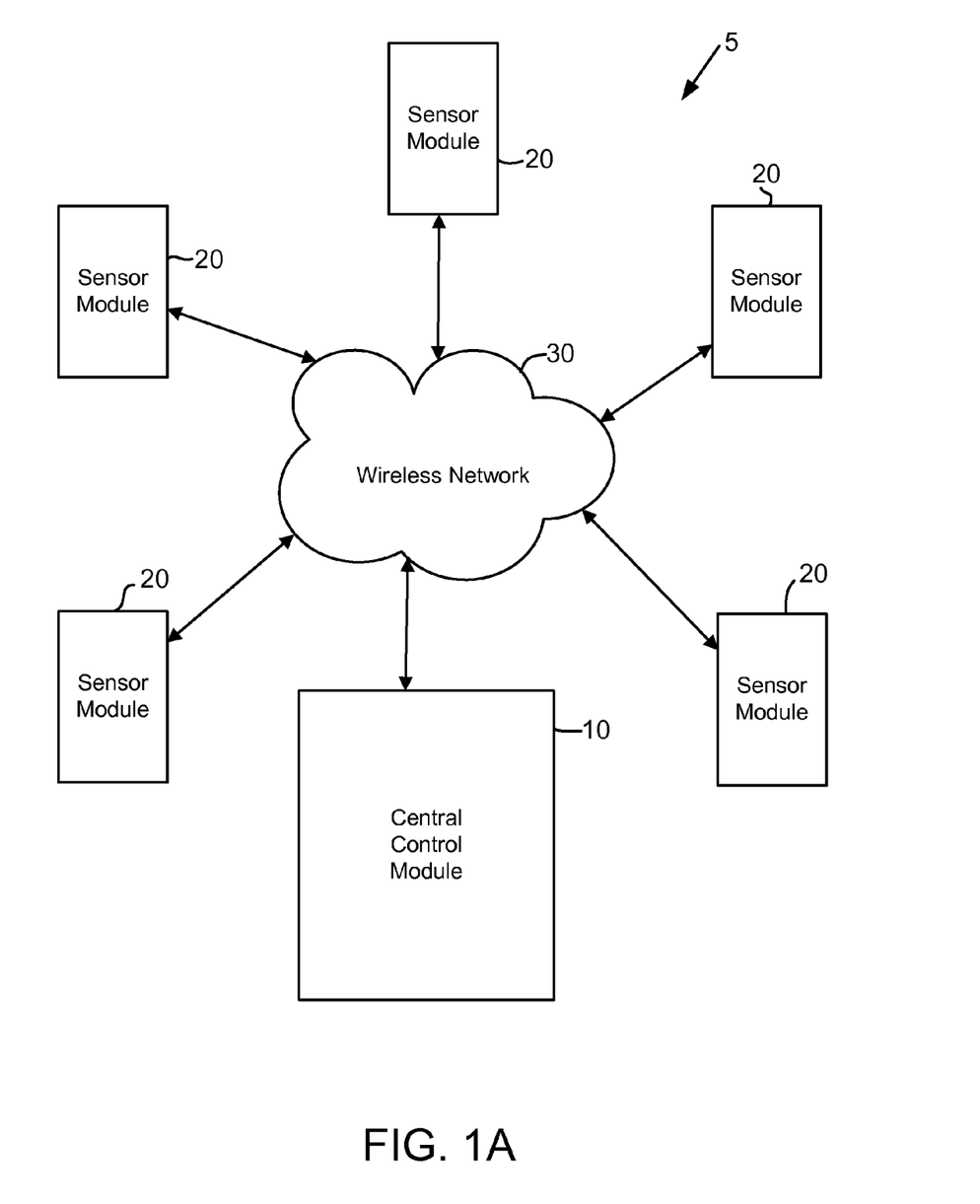
FIG. 1A is a schematic block diagram of an irrigation control system according to a representative embodiment.

Referring to FIG. 1A, in one specific embodiment, an irrigation control system 5 includes a central control module 10 communicable in wireless communication with a plurality of sensor modules 20 via a wireless network 30. The central control module 10 can be positioned at a central location, such as a house, garage, maintenance facility, or other desired accessible location. The sensor modules 20 are placed at one or more locations remote from the central location and about a desired irrigation area, such as a residential property, agricultural property, athletic field, park, and golf course. Preferably, the sensor modules 20 are placed in locations representative of irrigation zones to be controllable by the sensor module 20.

The wireless communication network 30 can be any of various networks known in the art (e.g., a wireless local area network (WLAN)) using any of various wireless communication standards known in the art (e.g., IEEE 802.11). In certain implementations, the wireless communication network 30 is configured to facilitate remote data transmission using any of various carriers (e.g., radio frequency) and protocols (e.g., TCP/IP, mobile wireless, WAN/LAN) known in the art. In other implementations, the central control module 10 and sensor modules 20 communicate with each other over the wireless network 30 using a communication protocol with a unique digital identification. Utilizing unique digital identification techniques facilitates the use of the irrigation control system 5 for large irrigation areas, such as golf courses, as opposed to smaller areas, such as residential properties. Although the illustrated embodiment provides for wireless communication over a wireless network, in other embodiments, communication between the sensor modules and central control module can be conducted over a wired network.

Figure 2:
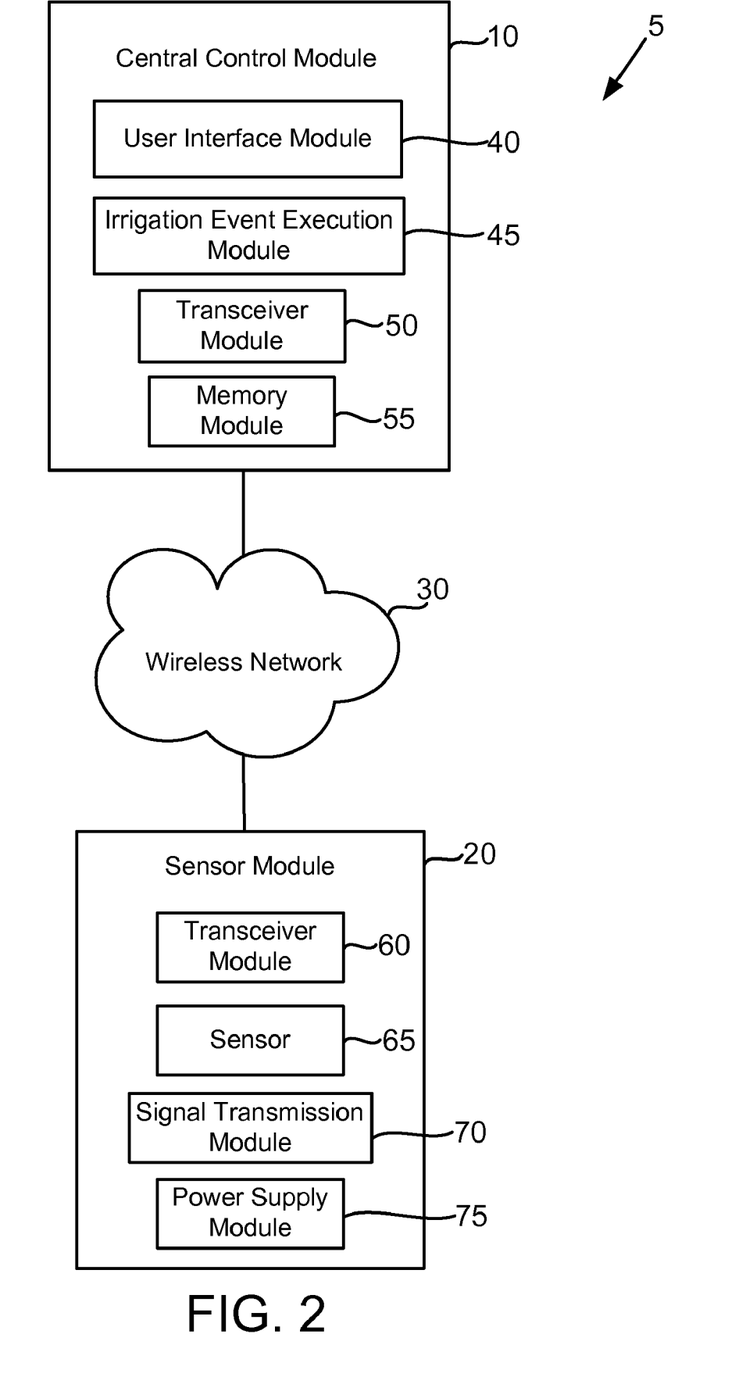
FIG. 2 is a schematic block diagram of an irrigation control system showing the features of a central control module and sensor module according to one embodiment.

As shown in FIG. 2, the central control module 10 includes a user interface module 40, an irrigation event execution module 45, and a transceiver module 50. The user interface module 40 is configured to receive user input or preferences regarding irrigation events. In some implementations, the user input can include desired soil moisture saturation thresholds, soil moisture depletion thresholds, a desired time interval in which irrigation events are executable, transmission frequency values, maximum flow rates, and moisture content rate of change thresholds for each irrigation zone, as well as any other desirable inputs. The user interface module 40 can include a graphical user interface for conveniently inputting user preferences and prompting a user for input. The central control module 10 can also include a memory module 55 that receives the user input from the user interface module 40 and stores the input in the one or more memory devices. The memory module 55 can also store executable code for executing the irrigation events and operation of other desirable programs.

The central control module 10 and each sensor module 20 include a transceiver module 50, 60, respectively. In the system 5 of FIG. 1A, the transceiver modules 50, 60 are each configured to transmit and receive data over the wireless network 30. Each transceiver module 50, 60 includes one or more transceivers. The transceivers can be any of various transceivers or transmitter-receivers commonly known in the art.

Figure 1B:
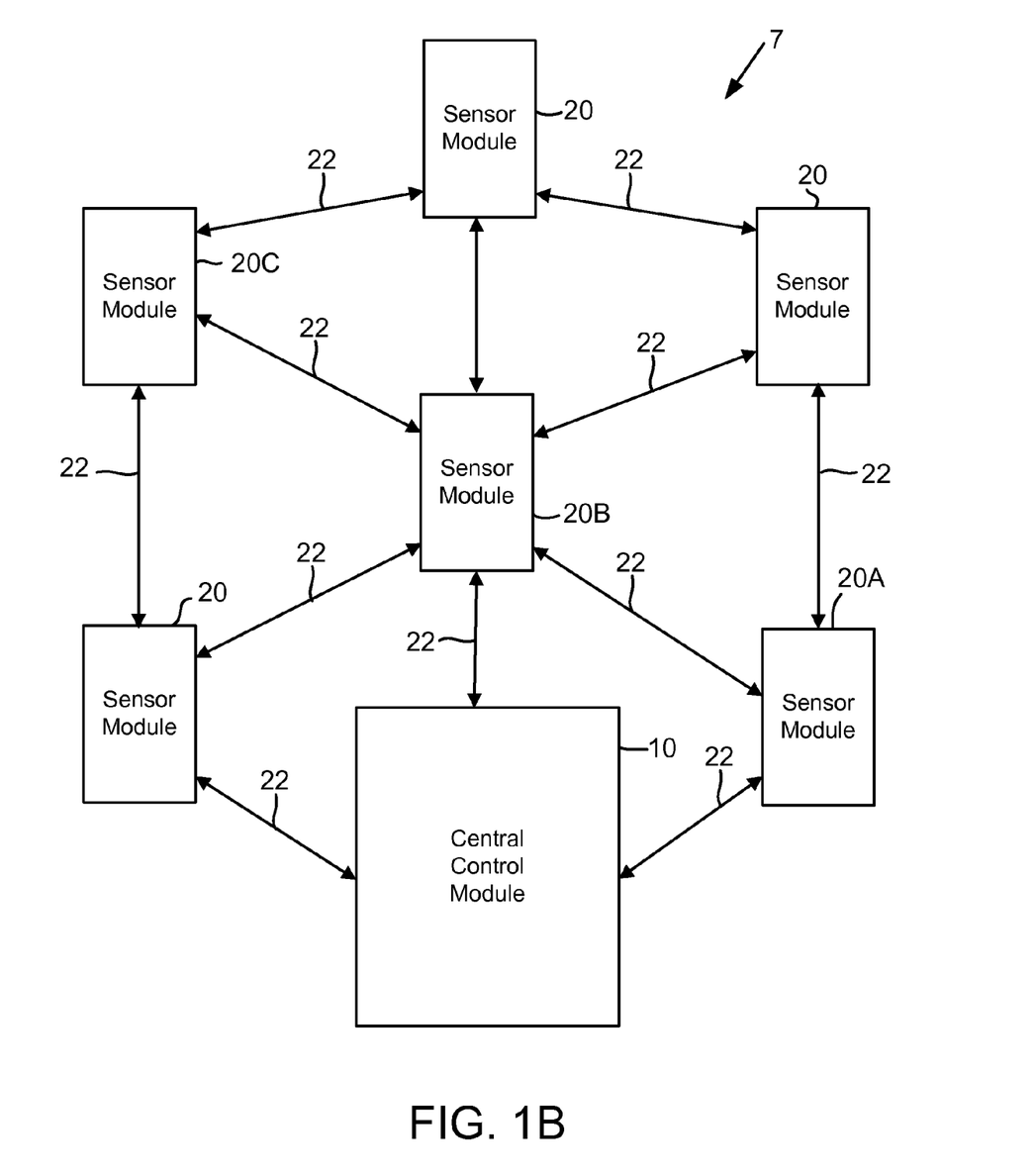
FIG. 1B is a schematic block diagram of an irrigation control system according to another representative embodiment.

An alternative embodiment of an irrigation control system 7 is shown in FIG. 1B. The irrigation control system 7 includes components similar to the components of system 5, with like numbers referring to like elements. However, the transceiver modules 60 of the sensor modules 20 of system 7 can be configured to transmit and receive data over a radio frequency communication network. Such transceiver modules 60 facilitate the ability of the sensor modules to wirelessly communicate with the central control module 10 and each other over peer-to-peer communications 22 to form a peer-to-peer sensor module network. The ability of the sensor modules 20 to wirelessly communicate with each other in this manner (as opposed to a conventional WLAN) allows the system 5 to operate on any sized property.

For example, in a golf course application, a plurality of sensor modules 20 can be spread out across the golf course by placing the sensor modules any of various spaced-apart locations throughout the golf course. Each sensor module (e.g., sensor module 20A) is in direct wireless communication via wireless communication 22 with adjacent sensor modules (e.g., sensor module 20B) within a range defined by the limitations of the transceiver 60. In certain implementations, the transceivers 60 of each module 20 have a range of about 500 feet. However, each sensor module (e.g., sensor module 20A) also is in indirect wireless communication with non-adjacent sensor modules (e.g., sensor module 20C) via the peer-to-peer wireless connections between adjacent and non-adjacent sensor modules. For example, in the illustrated embodiment, the sensor module 20A can send data to and receive data from the sensor module 20C via the individual wireless communications 22 between the sensor modules 20A and 20B, and the sensor modules 20B and 20C. For this configuration, sensor module 20B acts as a data communications controller by relaying data between the sensor modules 20A, 20C, In this manner, any one sensor module 20 can directly or indirectly wirelessly communicate with any other sensor module on the golf course. Accordingly, the sensor modules 20 can effectively network with each other, as well as the central control module 10, to dynamically coordinate the efficient execution of irrigation events on the golf course.

Each sensor module 20 includes a soil moisture sensor 65 configured to detect the moisture content (e.g., the volumetric water content) of soil in which it is embedded. In use, the sensor 65 is embedded directly into the soil to be monitored for water content. The sensor 65 can include any of various moisture sensing components known in the art, such as the EC5™ Moisture Sensor manufactured by Decagon of Pullman, Wash. The sensor 65 produces a voltage output corresponding to the detected moisture content and the transceiver module 60, or other module, converts the output into a signal representing the detected soil moisture data. The signal is communicated from the transceiver module 60 to the transceiver module 50 of the central control module 10 according to a specific timing pattern as discussed below. If desired, the detected soil moisture data represented by the signal can be stored in the memory module 55. The sensor 65 can be configured to take a soil moisture reading according to a desired frequency. In one exemplary embodiment, the sensor 65 takes a soil moisture reading every five seconds to a minute during irrigation events or rain events, and every minute to five minutes when irrigation and rain events are not occurring.

The sensors 65 are placed in one or more irrigation zones within an irrigation area. For example, in a residential application, one sensor 65 can be placed within a lawn area and another sensor 65 can be placed in a flower bed. The lawn area and flower bed can be divided into multiple zones. The lawn area zone in which the lawn sensor 65 is located can be defined as a master zone. The remaining lawn area zones are then set to follow (e.g., be dependent upon sensor readings from) the master zone with regards to irrigation events within the zones. The flower bed zones can be similarly and separately configured.

Figure 7:
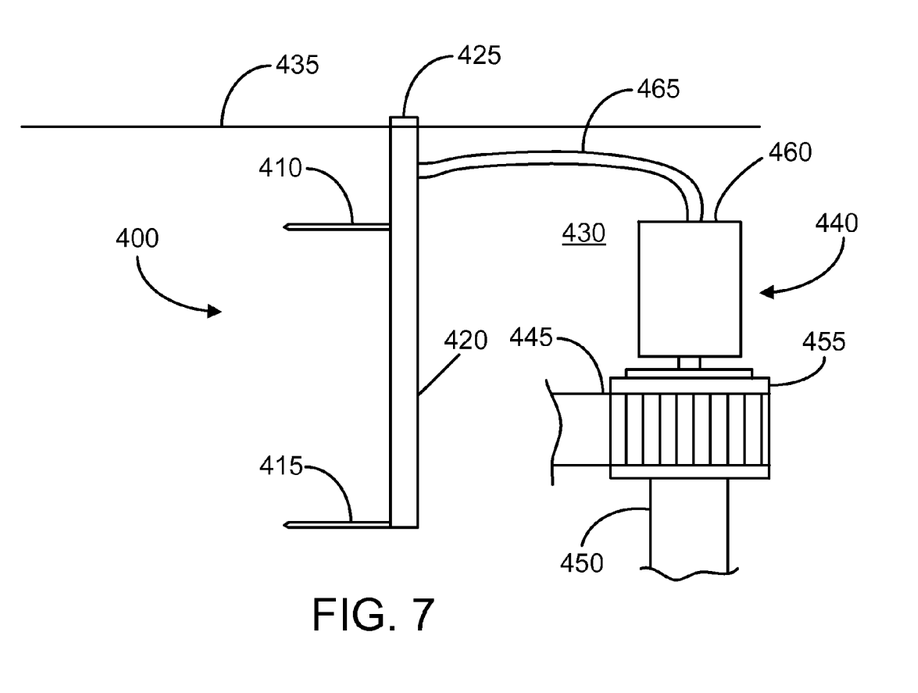
FIG. 7 is a side view of a sensor module according to one representative embodiment.

Referring to FIG. 7, and according to one exemplary embodiment, a sensor module 400 includes at least one sensor 410, 415 electrically coupled to a housing 420. The sensors 410, 415 and housing 420 are embedded in soil 430 below a surface 435 of the soil. The sensor module 400 also includes a transceiver 425 positioned at least partially above the surface 435 of the soil 430. The transceiver 425 wirelessly transmits communications to and receives communications from a central control module or other sensor modules remote from the sensor module 400. The transceiver 425 also can be configured to receive GPS signals.

In some embodiments, the sensor 65 of sensor module 20 includes a single sensor blade that detects the moisture content at a single soil plane or depth. However, in other embodiments, the sensor 65 can include multiple blades for detecting the moisture content at different soil planes or depths. For example, the sensor module 400 of FIG. 7 includes multiple vertically-spaced sensing blades 410, 415. Each blade is configured to sense the moisture content at a specific soil plane. In one specific implementation, the sensor 65 includes an upper blade (e.g., blade 410) configured to take moisture content measurements at a depth of about 1.5 inches below a surface of the soil, and a lower blade (e.g., blade 415) configured to take moisture content measurements at a depth of about six inches below the surface. In other implementations, the sensor 65 can include more than two spaced-apart blades for taking moisture content measurements at any of various depths below the surface of the soil as desired without departing from the essence of the invention. In certain implementations, each blade includes a dielectric sensor and the sensor module detects volumetric water content in the soil using dielectric constant data sensed by the blade.

Water behaves differently in different types of soils. For example, water tends to move through fine clay soils at a slower rate compared to sandy soils. Moreover, soils (e.g., poor quality soils) can be adjusted by adding soil of a different type or taking soil away, both of which can affect the behavior of water in the soils. For example, water may behave differently in a sandy soil that has been altered by adding peat moss, or other organic material. Additionally, a soil specimen may include stacked layers of different types of soil (e.g., mulch, dirt, rocks, clay, sand, or other soil types).

Desirably, the characteristics of an irrigation event (e.g., timing, duration, and water flow rate) are dynamically controlled according to the behavior of water in the soil type being watered. Conventional single-blade moisture sensors capable of detecting the moisture content at only a single depth cannot provide an indication of the type of soil to be watered or an accurate assessment of the behavior of water in the soil, particularly soils with stacked layers of differing soil types. Detecting moisture content at multiple soil planes or depths may be helpful to more accurately determine the water behavior (e.g., soil moisture, holding capacity, soil moisture depletion rates, and percolation rates) for different soil types or soil specimens and adjustably controlling an irrigation event accordingly. The sensor module 400 with multiple sensing blades is capable of detecting the moisture content at multiple depths of a soil specimen. Regardless of the soil type, whether the soil characteristics have be altered, or whether the soil has stacked layers, the multiple moisture content readings would be compared, such as by averaging, to provide an accurate determination of the behavior of water in and the overall moisture content for the soil.

Figure 3:
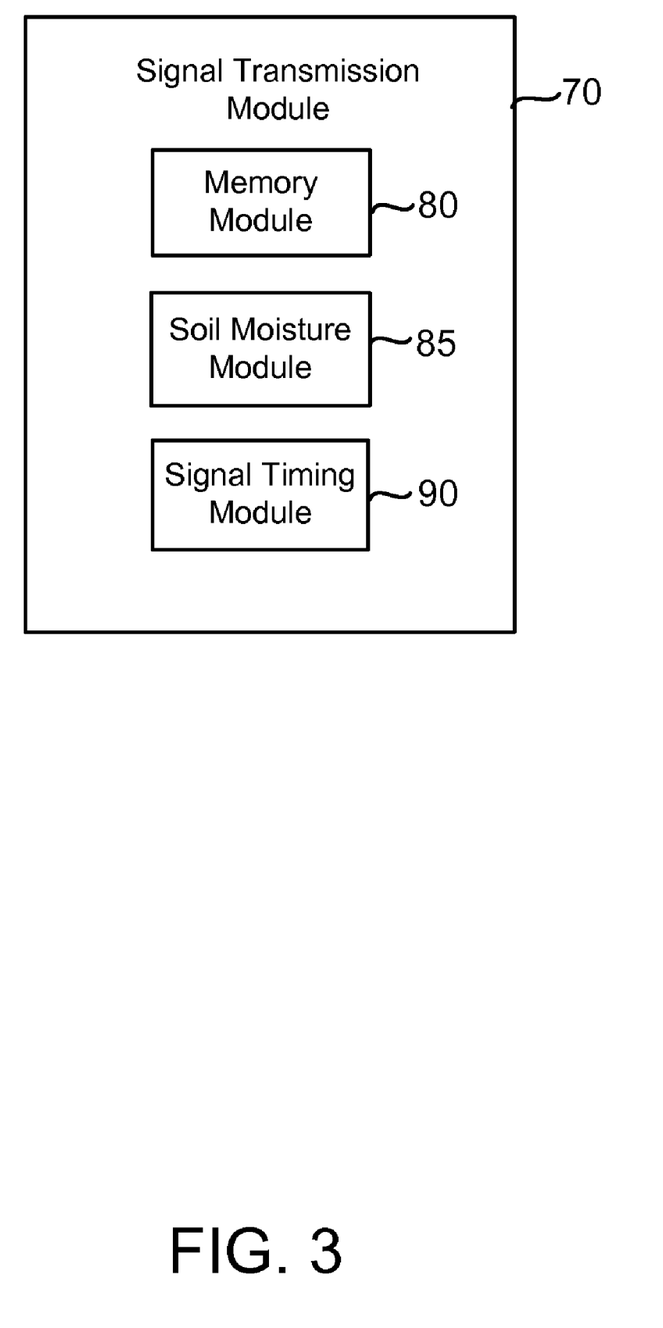
FIG. 3 is a schematic block diagram of a signal transmission module of a sensor module according to one embodiment.

The sensor module 20 also includes a signal transmission module 70. Referring to FIG. 3, the signal transmission module 70 includes a memory module 80, soil moisture module 85, and signal timing module 90.

The memory module 80 includes one or more memory devices configured to store soil moisture content data. The memory module 80 is also configured to store data received from the sensor 65 regarding the conditions of the irrigation area soil, e.g., soil moisture content.

The soil moisture module 85 receives and translates data from the sensor 65 to determine various characteristics of the moisture content of the soil in the irrigation area. For example, the soil moisture module 85 interprets signals from the sensor 65 to determine the moisture content (e.g., percentage of moisture) in the soil associated with the sensor module 20. The soil moisture module 85 transmits the moisture content data to the memory module 80 for storage. Further, the soil moisture module 85 is configured to compare current soil moisture data with previously detected and stored moisture data to determine a rate at which the moisture in the soil is changing. The soil moisture module 85 is communicable in data transmitting communication with the signal timing module 90 to transmit the determined moisture content rate of change to the signal timing module.

Based on the determined moisture content rate of change received from the soil moisture module 85, the signal timing module 90 is configured to implement one of two or more signal timing schedules. Each signal timing schedule represents a rate at which the sensor module 20 transmits detected soil moisture data to the central control module 10. During soil moisture depletion or drying out events, i.e., when water is not being added to the irrigation zone in question such that the moisture content rate of change is constant or decreasing, soil moisture data is transmitted according to a low frequency timing schedule or at a relatively low rate. In contrast, a high frequency timing schedule associated with a relatively high data transmission rate is selected and implemented when the determined moisture content rate of change is rising (e.g., during an irrigation or precipitation event). In one specific implementation, the low frequency timing schedule includes transmitting soil moisture content data from the sensor module 20 to the central control module 10 once every time period ranging between about one hour to about six hours, and the high frequency timing schedule includes transmitting soil moisture content continuously as it is detected by the sensor 65 (e.g., once every five seconds to a minute).

Generally, more energy is required to transmit data than to take a soil moisture reading with the sensor. Therefore, utilizing different (e.g., passive and aggressive) data transmission timing schedules, the irrigation control system 5 is able to conserve energy when the moisture levels in the soil are not significantly changing and continuous data transmission is not necessary. But when continuous data transmission is necessary, such as to determine when to stop an irrigation event, the data transmission timing is automatically increased to quickly and more precisely detect rate changes in the soil moisture content. When the detected soil moisture content rises above a predetermined level, the controller stops the irrigation event. In this manner, the system of the present application dynamically controls the characteristics of a watering event based on real-time moisture content readings, as opposed to a predetermined watering schedule, to prevent over-watering, conserve water, and reduce water utility costs.

The transceiver module 60 and sensor 65 are powered by a power supply module 75. The power supply module 75 is configured to supply power to the transceiver module 60 and sensor 65. In certain implementations, the power supply module 75 includes a rechargeable battery, such as a 9V rechargeable battery, lithium ion battery, nickel metal hydride battery, nickel cadmium battery, and the like. The power supply module 75 can include a battery recharging system. In some implementations, the battery recharging system includes a solar regenerator system that has a solar panel coupled to the sensor module 20. The solar panel can be mounted to the sensor 65 such the solar panel is installed flush with the surface of the soil when the sensor is embedded within the soil. In this manner, the solar panel can be protected from damage by the soil and plants (e.g., grass) growing in the soil. In other implementations, the battery recharging system includes a hydro-electric regenerator system coupled to (e.g., embedded within) one or more water supply lines. Water flowing through the water supply lines activates the hydro-electric regenerator system to recharge the battery.

In one specific implementation shown in FIG. 7, a hydro-electric regenerator system includes a hydro-electric generator 440 with a turbine 455 in water receiving communication with a water inlet supply line 445. Water flowing through the water supply inlet line 445 rotates the turbine 455, which is coupled to a generator 460. Rotation of the turbine 455 causes the generator 460 to generate electricity that is supplied to the sensor module 400 via an electrical supply wire 465. After passing through the turbine 455, water exits the turbine via a water supply outlet line 450.

In addition to powering the transceiver module 60 and sensor 65, the power supply module 75 can power irrigation valves and/or remote controllers. Although not shown, the central control module 10 can include a power supply module similar to the power supply module 75 of the sensor module 20.

Generally, the irrigation event execution module 45 is configured to utilize data received from the sensor modules 20, generate an irrigation event profile, and execute an irrigation event according to the irrigation event profile. More specifically, the irrigation event execution module 95 is configured to execute an irrigation event based at least partially on the soil moisture data received from the sensor modules 20 and the desired time interval in which irrigation events are executable. The desired time interval can be set according to any of various factors, such as user preferences and water regulation ordinances associated with the irrigation area.

In one specific implementation, the desired time interval includes the time period between 6:00 p.m. and 6:00 a.m. In other implementations, the desired time interval can include one or more continuous or spaced-apart time periods. For example, the desired time interval can include a time period between 4:00 a.m. and 8:00 a.m. and a time period between 5:00 p.m. and 9:00 pm. For systems having multiple sensor modules 20 each associated with one or more irrigation zones, the desired time interval includes multiple desired time intervals each associated with a respective one or more of the sensor modules 20. For example, a first desired time interval between 4:00 a.m. and 5:00 a.m. can be associated with a first sensor module 20 and first irrigation zone, a second desired time interval between 5:00 a.m. and 6:00 a.m. can be associated with a second sensor module 20 and a second irrigation zone, and a third desired time interval between 6:00 a.m. and 7:00 a.m. can be associated with a third sensor module and a third irrigation zone.

In certain implementations, the various modules of the system 5 include an atomic time module configured to read an over-the-air time signal, such as the Atomic Radio Time Signal (ARTS), to synchronize (e.g., time-stamp) the transmission and reception of data and to align activation of irrigation events with desired time intervals. In conjunction with synchronizing the transmission and reception of data using the ARTS, in certain implementations, the actual time of each data transmission within the system can be randomized using a random time generator. For example, each data transmitting component of the system can include a random time generator module configured to randomize the data transmissions generated by the respective components. In this manner, such transmissions comply with government agency enacted rules and regulations, such as rules and regulations governing transmissions of radio information enacted by the Federal Communications Commission.

In certain implementations, each sensor module 20 includes a GPS module configured to receive a GPS signal and gather data based on the GPS signal. In certain implementations, the GPS module determines a location of the sensor module 20, or other components of the system, based on the GPS signal. In the same or other implementations, the GPS module determines a current time based on the GPS signal. Knowledge of the exact location of sensor modules 20 can be beneficial when attempting to locate a malfunctioning sensor module or for determining the distances between respective sensor modules. Time information gathered from the GPS signal can be used for synchronization purposes in the same manner as the ARTS as described above.

Generally, the irrigation event execution module 95 executes an irrigation event when the soil moisture content as detected by the sensor modules 20 meets or drops below a soil moisture depletion threshold and the present time is within the desired time interval. In certain implementations, a sensor module 20 automatically determines the soil type in which the modules are embedded and automatically sets an irrigation event start point corresponding with a volumetric water content lower threshold (e.g., moisture depletion level) based on the determined soil type. Generally, the volumetric water content lower threshold is associated with a minimum dryness of the soil. When the detected volumetric water content of the soil meets or drops below the volumetric water content lower threshold, the irrigation event start point is triggered and the irrigation control system executes an irrigation event in the master zone or follower zones associated with the sensor module unless the current time is outside of a predetermined watering window. The irrigation event execution module 95 executes an irrigation event for a particular irrigation zone by requesting an irrigation valve associated with the irrigation zone to open. Opening the irrigation valve allows water to flow through the valve, to the sprinklers associated with the irrigation zone, and out of the sprinklers onto the irrigation zone.

Each sensor module 20 also automatically sets an irrigation event stop point corresponding with a volumetric water content upper threshold (e.g., moisture saturation level) based on the determined soil type. The volumetric water content upper threshold is associated with a determined field capacity of the soil (e.g., the amount of water a particular soil type is able to hold without run-off or leaching). An executed irrigation event continues until the irrigation event stop point is triggered (e.g., the detected volumetric water content of the soil meets or rises above the volumetric water content upper threshold), at which time the irrigation event execution module 95 ends the irrigation event. Because the execution of the irrigation events in the systems 5, 7 is based on the moisture content of the soil, the watering schedule changes over time as demands for water change.

In some instances, the irrigation event execution module 95 may end the irrigation event when the current time falls outside of the predetermined watering window. The irrigation event is ended by requesting the irrigation valve to close. The irrigation valves can be opened and closed using one or more valve actuators, such as a DC latching solenoid.

Although the irrigation event start and stop points are automatically determined by the sensor modules in some embodiments, in the same or alternative embodiments, the irrigation event start and stop points can be manually set or adjusted. In some instances, the user interface module 40 of the central control module 10 can include a user interface tool that facilitates the adjustment of the irrigation event start and stop points.

For systems having multiple sensor modules 20, each associated with one or more irrigation zones, the irrigation event execution module 95 can monitor and differentiate between the soil moisture data for each of the sensor modules 20. In certain implementations, each irrigation zone has associated irrigation event start and stop points that may be different than another irrigation zone. Accordingly, irrigation event start points for different irrigation zones can be triggered at the same time. If the water flow capacity of the irrigation area permits, the irrigation event execution module 95 will execute simultaneous irrigation events for each of the irrigation zones for which the irrigation event start points have been triggered.

However, if the water flow capacity of the irrigation area does not permit multiple concurrent irrigation events, then the irrigation event execution module 45 automatically prioritizes the triggered irrigation events based on dynamically adjustable prioritization parameters. The prioritization parameters can include the relative need for an irrigation event on the irrigation zones for which an irrigation event has been concurrently triggered. Generally, the irrigation zones with drier soil conditions will take precedent over irrigation zones with wetter soil conditions. More specifically, the irrigation event execution module 95 can compare a current soil moisture content of the respective irrigation zones with the associated volumetric water content lower threshold of the respective irrigation zones. The triggered irrigation events can then be prioritized based on the relative differences between the current soil moisture contents of the irrigation zones and their respective volumetric water content lower thresholds. In other words, irrigation events are first performed on irrigation zones with the highest difference between the current soil moisture contents of the irrigation zones and their respective volumetric water content lower thresholds, while irrigation events are delayed on irrigation zones with lower differences. Accordingly, the prioritization of concurrently triggered irrigation events is dynamically adjustable to compensate for changes in the current soil moisture content of the respective irrigation zones that may occur over time, such as due to soil type changes or other external factors.

The central control module 95 is configured to monitor the individual water flow rates of irrigation events on each irrigation zone. In this manner, the irrigation control system 5 can accurately track and report water usage for the irrigation area. Moreover, based on the monitored water flow rates for each irrigation event, the irrigation event execution module 50 can effectively prioritize multiple triggered irrigation events. The total water flow rates for concurrent irrigation events cannot exceed the water flow capacity of the system. Therefore, the irrigation event execution module 50 calculates the combined water flow rate for multiple triggered irrigation events based on the monitored water flow rates. If the combined water flow rate for multiple triggered irrigation events exceeds the water flow capacity of the system, the irrigation event execution module 50 will delay one or more irrigation events until the calculated combined water flow rate fall within the water flow capacity of the system.

In some implementations, the irrigation event execution module 95 is configured to detect a rain event and postpone irrigation events until rain events conclude. The irrigation event execution module 95 compares soil moisture content data from a sensor module 20 in one irrigation zone to soil moisture content data from a sensor module 20 in another irrigation zone. Assuming an irrigation event is not occurring at both irrigation zones, a similar increase in the soil moisture content from both sensor modules 20 would indicate a rain event is occurring.

The central control module 10 can include any of various irrigation control units known in the art modified to implement the system and methods described herein. Accordingly, the central control module 10 can include a suitably modified existing controller or a controller manufactured specifically to implement the described system and methods. Moreover, although not particularly shown, the irrigation control systems described herein can be configured to dispense more than just water onto an irrigation area. For example, in some embodiments, an irrigation control system can control the operation of a fertilizer or pest control distribution system independently of water irrigation events.

Figure 4:
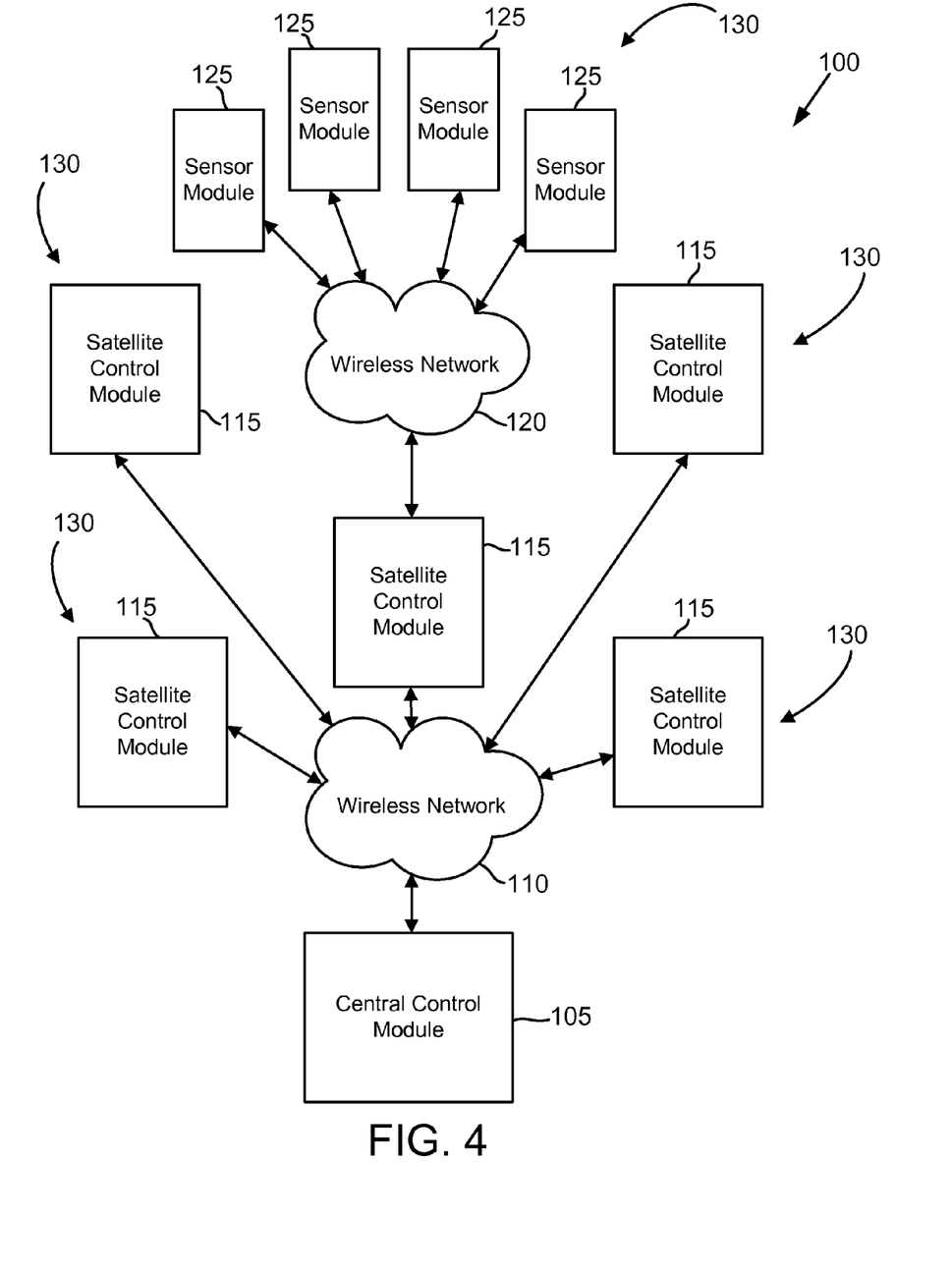
FIG. 4 is a schematic block diagram of an irrigation control system according to another representative embodiment.

Referring to FIG. 4, an irrigation control system 100 according to another embodiment is shown. Like the irrigation control system 5, the irrigation control system 100 includes a central control module 105, wireless network 110, and sensor modules 125. However, the irrigation control system 100 is configured for use with large irrigation areas. The irrigation control system 100 includes a plurality of satellite control modules 115 communicable in data transmitting and receiving communication with the central control module 105 via the wireless network 110. Each satellite control module 115 is further communicable in data transmitting and receiving communication with one or more sensor modules 125 via a wireless network 120 to form an irrigation station 130. Accordingly, the irrigation control system 100 includes multiple irrigation stations 130. In certain implementations, the sensor modules 125 of each irrigation station 130 can communicate with each other over a wireless communication system as discussed above with reference to FIG. 1B. Each irrigation station 130 is associated with a respective irrigation area, which is divided up into irrigation zones with each zone being monitored for moisture content via a respective one or more of the sensor modules 125. The wireless networks 110, 120 can be separate and distinct wireless networks or the same wireless network. The wireless networks 110, 120 can be a single conventional wireless network or multiple peer-to-peer individual radio frequency communication networks.

The satellite control module 115 of each irrigation station 130 is configured to at least partially control irrigation events for the irrigation area and zones associated with the irrigation station. In some implementations, the satellite control modules 115 include a transceiver capable of transmitting and receiving data over large areas. In this manner, soil moisture data detected by the sensor modules 125 can be relayed through multiple components to the central control module 105 via the wireless networks 110, 120, and data requests and signal timing schedule updates can be transmitted to the sensor modules 125 via the wireless networks 110, 120. The central control module 105 is configured to prioritize, activate, and control the multiple irrigation stations 130. For example, based on the soil moisture data received from the associated sensor modules 125, each satellite control module 115 determines if its irrigation zone requires an irrigation event and communicates this information (e.g., via a request) to the central control module 105. The central control module 105 then grants, rejects, or suspends the request based on predetermined prioritization parameters. For example, if multiple irrigation areas or zones require an irrigation event, the central control module 105 can control the satellite control modules 115 to efficiently prioritize the watering events based on whether two or more irrigation events can be run simultaneously and the watering time intervals for the irrigation areas or zones.

Figure 5:
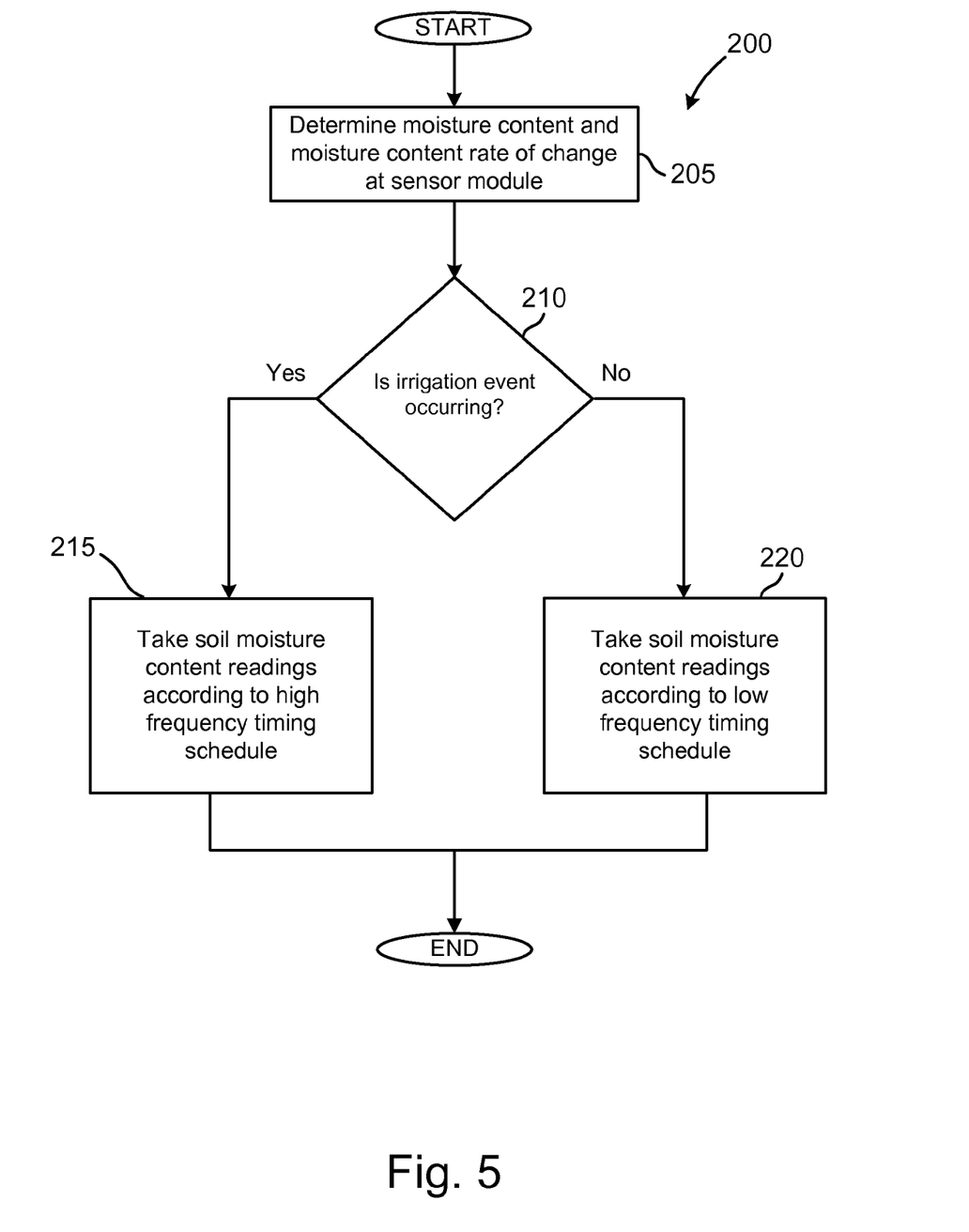
FIG. 5 is a schematic flow chart diagram of a method for controlling data transmission from a sensor module to a control module is shown according to one representative embodiment.

Referring to FIG. 5, a method 200 for controlling a moisture content reading rate of a moisture sensor is shown according to one embodiment. The method 200 begins by determining 205 a rate of change of the moisture content in the soil in an irrigation zone using the soil moisture module 85. The rate of change can be determined by detecting the moisture content of the soil in an irrigation zone using the sensor module 20 at a first moment in time, detecting the moisture content of the soil in the irrigation zone using the sensor module at a second moment in time, and comparing the moisture content at the second moment in time with the moisture content at the first moment in time.

The method 200 then determines whether an irrigation event is occurring at 210. If determined at 210 that an irrigation event is occurring, then the method 200 takes soil moisture content readings according to a high frequency timing schedule at 215 and the method ends. If, however, an irrigation event is not occurring then the method 200 takes soil moisture readings according to a low frequency timing schedule at 220 and the method ends.

Figure 6:
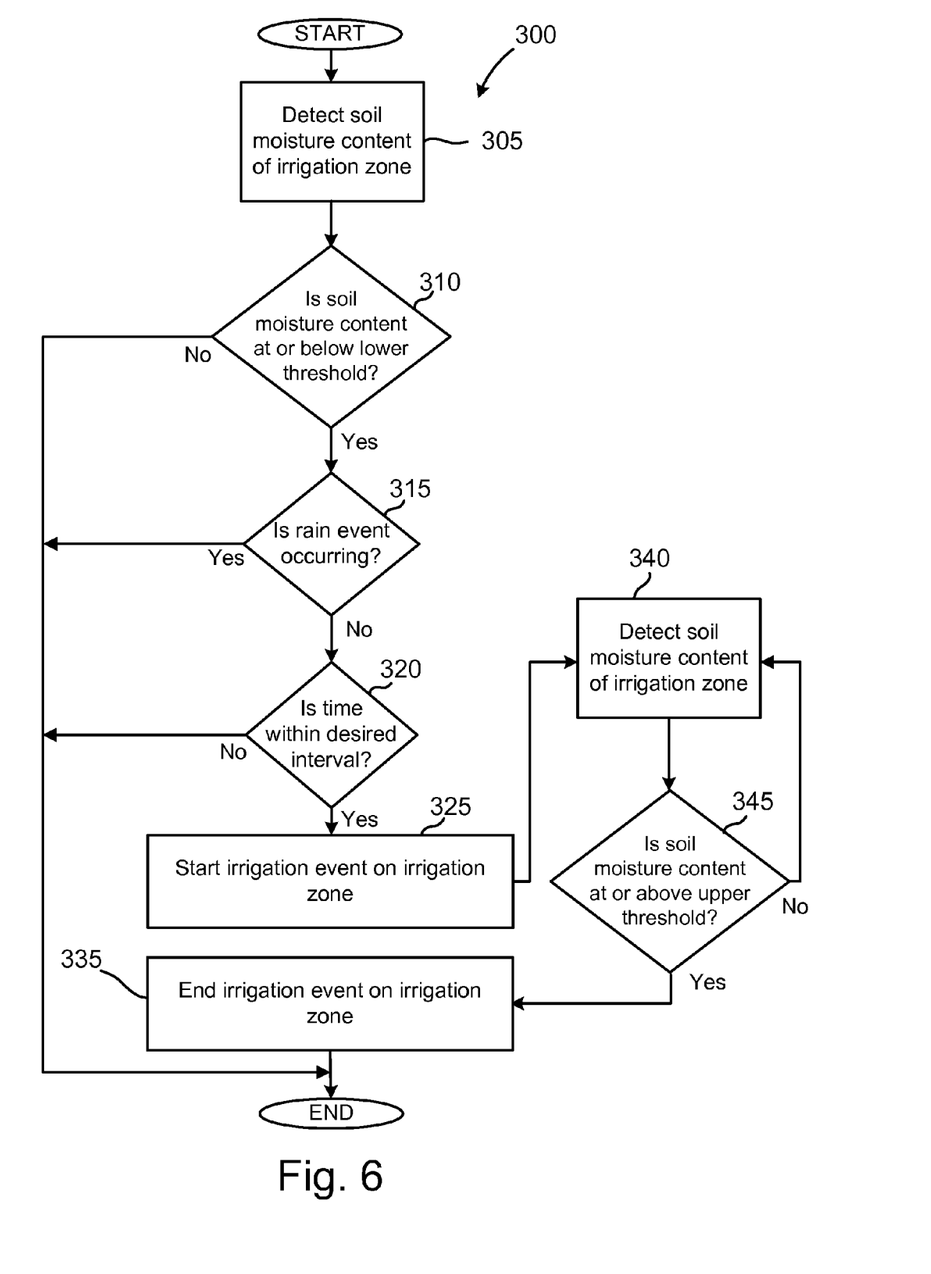
FIG. 6 is a schematic flow chart diagram of a method for controlling an irrigation event according to a representative embodiment.

Referring to FIG. 6, a method 300 for controlling an irrigation event according to one embodiment is shown. The method 300 includes detecting 305 the moisture content of the soil in an irrigation zone, such as by using a sensor module. The detected soil moisture content can be transmitted to a central control module. After the soil moisture content data is received by the control module, the control module determines whether the moisture content of the soil as indicated by the transmitted data is below a moisture depletion threshold at 310. If the determination at 310 is answered in the affirmative, then the method 300 proceeds to determine at 315 whether a rain event is occurring. Determining whether a rain event is occurring can include comparing the soil moisture rate of change at two or more separate irrigation zones using two or more sensor modules. If the soil moisture rates of change at the respective irrigation zones are increasing, a rain event is likely occurring. If a rain event is not occurring, then the method 300 determines whether the present time is within a desired time interval associated with the irrigation area corresponding with the sensor module at 320.

If the present time is within the desired time interval, the method 300 proceeds to execute or start 325 an irrigation event at the irrigation zone associated with the sensor module. The irrigation event continues until a detected soil moisture content of the irrigation zone as detected at 340 reaches or exceeds an upper threshold as determined at 345, at which time the irrigation event ends at 335. If it is determined that the soil moisture content is not greater than the predetermined threshold at 310, a rain event is occurring at 315, or the present time is not within a desired time interval at 320, then no irrigation event occurs and the method 300 ends.

With systems having multiple sensor modules 20, in some implementations, the methods 200, 300 are run for each sensor module 20 and associated irrigation zone simultaneously. In other implementations, the methods 200, 300 are run for a respective sensor module 20 only during a desired time interval for the sensor module 20. In some instances, the methods 200, 300 are run at different times for each sensor module 20.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Where a module or portions of a module are implemented in software, the software portions are stored on one or more computer readable media.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. For example, various specific embodiments of the disclosed apparatus, system, and method are described in the several appended claims below. The embodiments described above and in the following claims are to be considered in all respects only as illustrative and not restrictive.

Several specific embodiments of the apparatus, system, and method of the present disclosure are defined according to the following appended claims:

The invention claimed is:

1. An apparatus for controlling irrigation events, comprising:
at least one sensor module configured to detect the soil moisture content of soil in an irrigation area, the at least one sensor module further configured to determine a rate of change of the soil moisture content based on the detected soil moisture content, wherein a rate at which the at least one sensor module detects the soil moisture content of the soil is based on the determined rate of change of the soil moisture content; and
a central control module configured to execute an irrigation event for the irrigation area if the detected soil moisture content reaches a moisture content lower threshold, and wherein the central control module is further configured to terminate the irrigation event for the irrigation area if the detected soil moisture content reaches a moisture content upper threshold.

2. The apparatus of claim 1, wherein the at least one sensor module detects the soil moisture content of the soil at a first rate when the determined rate of change of the soil moisture content is above a threshold and at a second rate when the detected rate of change of the soil moisture content is below the threshold, the first rate being faster than the second rate.

3. The apparatus of claim 2, wherein the determined rate of change of the soil moisture content is above the threshold during an irrigation event.

4. The apparatus of claim 1, wherein the at least one sensor module comprises a plurality of sensor modules each associated with a respective portion of the irrigation area, wherein the central control module is configured to control the timing and duration of irrigation event based on a comparison between the soil moisture content data received from the plurality of sensor modules.

5. The apparatus of claim 1, wherein the at least one sensor module comprises a power supply module comprising a battery and a battery recharging system, the battery powering the at least one sensor module.

6. The apparatus of claim 5, wherein the battery recharging system comprises a solar regenerator system.

7. The apparatus of claim 5, wherein the battery recharging system comprises a hydro-electric regenerator system.

8. The apparatus of claim 1, further comprising a time module configured to time-stamp the communication of soil moisture content data to the central control module, wherein the time-stamp is based on at least one of an atomic radio time signal and a GPS signal.

9. The apparatus of claim 1, wherein the at least one sensor module comprises a GPS module configured to receive a GPS signal and determine a location of the at least one sensor module based on the GPS signal.

10. The apparatus of claim 1, wherein the at least one sensor module comprises at least one soil moisture sensor embeddable within the soil of the irrigation area, the at least one soil moisture sensor configured to detect the soil moisture content of the soil on at least two vertically-separated planes of the soil.

11. The apparatus of claim 10, wherein the soil moisture content of the irrigation area is based on a comparison between the detected soil moisture contents of the respective at least two vertically-separated planes of the soil.

12. A system for controlling irrigation events, comprising;
a central controller remote from an irrigation area comprising at least two irrigation zones;
at least two satellite controllers each positioned within a respective one of the at least two irrigation zones, each satellite controller configured to execute irrigation events for the corresponding irrigation zone of the irrigation area in response to communications received from the central controller, wherein the at least two satellite controllers and the central controller communicate over a first wireless network; and at least two sensors each positioned within a respective one of the at least two irrigation zones, each sensor being configured to detect a soil moisture content of the corresponding irrigation zone and configured to transmit soil moisture content data to a corresponding satellite controller via a second wireless network.

13. The system of claim 12, further comprising at least two rechargeable power sources each in power supply communication with a respective one of the at least two sensors.

14. The system of claim 12, wherein the at least two satellite controllers each generate irrigation event requests for a corresponding irrigation zone based on the detected soil moisture content of the corresponding irrigation zone, the requests being communicated to the central controller, and wherein the central controller grants, rejects, or suspends the requests based on predetermined prioritization parameters.

15. The system of claim 14, wherein the predetermined prioritization parameters are based on at least one of an impact of simultaneous execution of multiple irrigation events and pre-scheduled watering time intervals for each irrigation zone.

16. A method for controlling an irrigation event for an irrigation area, the method comprising:

detecting a soil moisture content of a plurality of irrigation zones of the irrigation area using a plurality of sensors each located within a respective irrigation zone;

determining an irrigation event prioritization schedule if the detected soil moisture content of at least two of the plurality of irrigation zones reaches respective lower thresholds, the prioritization schedule being based on a water flow capacity associated with the irrigation area; and executing at least one irrigation event according to the irrigation event prioritization schedule.

17. The method of claim 16, wherein executing the irrigation event comprises executing the irrigation event if the soil moisture content for the irrigation area is below the depletion method, a rain event is not occurring, and a desired execution time is within a predetermined time interval.

18. The method of claim 16, wherein the irrigation event prioritization schedule comprises concurrently executing irrigation events for the at least two of the plurality of irrigation zones if a predicted combined water flow rate for the irrigation events is less than the water flow capacity.

19. The method of claim 16, wherein the irrigation event prioritization schedule comprises postponing the execution of an irrigation event for at least one of the at least two of the plurality of irrigation zones if a predicted combined water flow rate for irrigation events for the at least two of the plurality of irrigation zones is more than the water flow capacity.

20. The method of claim 16, further comprising tracking a flow rate of water into the irrigation area during the at least one irrigation event.

* * * * *